United States Patent
Khitrenovich et al.

(10) Patent No.: US 9,594,911 B1
(45) Date of Patent: Mar. 14, 2017

(54) METHODS AND APPARATUS FOR MULTI-FACTOR AUTHENTICATION RISK DETECTION USING BEACON IMAGES

(75) Inventors: Anton Khitrenovich, Kfar-Yona (IL); Oleg Freylafert, Hod Hasharon (IL); Yedidya Dotan, Newton, MA (US); Maor Franco, Ness Ziona (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 601 days.

(21) Appl. No.: 13/617,210

(22) Filed: Sep. 14, 2012

(51) Int. Cl.
*G06F 21/57* (2013.01)
*H04L 29/06* (2006.01)

(52) U.S. Cl.
CPC ........ *G06F 21/577* (2013.01); *H04L 63/1433* (2013.01)

(58) Field of Classification Search
CPC ...................................................... G06F 21/57
USPC .... 726/2, 4–5, 17–18, 25–30; 713/155, 161, 713/168–170
See application file for complete search history.

(56) References Cited

U.S. PATENT DOCUMENTS

| | | | | |
|---|---|---|---|---|
| 8,001,597 | B2 * | 8/2011 | Crooks | 726/22 |
| 9,282,114 | B1 * | 3/2016 | Dotan | G06F 21/552 |
| 2003/0217289 | A1 * | 11/2003 | Ammon | H04L 63/1416 |
| | | | | 726/23 |
| 2004/0235453 | A1 * | 11/2004 | Chen | H04L 63/1416 |
| | | | | 455/410 |
| 2006/0156385 | A1 * | 7/2006 | Chiviendacz et al. | 726/2 |
| 2006/0212350 | A1 * | 9/2006 | Ellis | G06Q 30/0242 |
| | | | | 705/14.41 |
| 2008/0189788 | A1 * | 8/2008 | Bahl | G06F 21/577 |
| | | | | 726/25 |
| 2009/0164646 | A1 * | 6/2009 | Christian | G06F 9/5027 |
| | | | | 709/228 |
| 2009/0228780 | A1 * | 9/2009 | McGeehan | G06F 21/55 |
| | | | | 715/234 |
| 2012/0084866 | A1 * | 4/2012 | Stolfo | G06F 21/554 |
| | | | | 726/25 |
| 2013/0212465 | A1 * | 8/2013 | Kovatch | G06F 17/227 |
| | | | | 715/234 |

OTHER PUBLICATIONS

RSA Adaptive Authentication Integration Adapter 1.1.1 for NetScaler, Integration Guide, RSA, The Security Division of EMC, 2010, pp. 1-83.

* cited by examiner

*Primary Examiner* — Josnel Jeudy
(74) *Attorney, Agent, or Firm* — Ryan, Mason & Lewis, LLP

(57) ABSTRACT

Methods and apparatus are provided for multi-factor authentication of a user using beacon images. Access is provided to a protected resource by receiving a browser request for a beacon image, wherein the beacon image is embedded in an access request page (e.g., a login page) for the protected resource; collecting data in response to the browser request from a device associated with the browser; and providing the data for a risk assessment of the request. The beacon image comprises, for example, a substantially invisible image and can be loaded when the access request page is loaded in the browser or when a user submits credentials in the access request page.

20 Claims, 4 Drawing Sheets

T1 – USER SENDS REQUEST TO VPN TO ACCESS PROTECTED RESOURCE USING ACCESS CREDENTIALS
T2 – VPN PASSES ACCESS CREDENTIALS TO FIRST LEVEL AUTHENTICATION SERVER
T3 – VPN CONTACTS INTEGRATION ADAPTER FOR SECOND LEVEL AUTHENTICATION
T4 – BROWSER IS REDIRECTED TO AA ADAPTER FOR SECOND LEVEL AUTHENTICATION
T5 – AA ADAPTER COMMUNICATES WITH SECOND LEVEL AUTHENTICATION SERVER FOR SECOND LEVEL AUTHENTICATION

FIG. 4

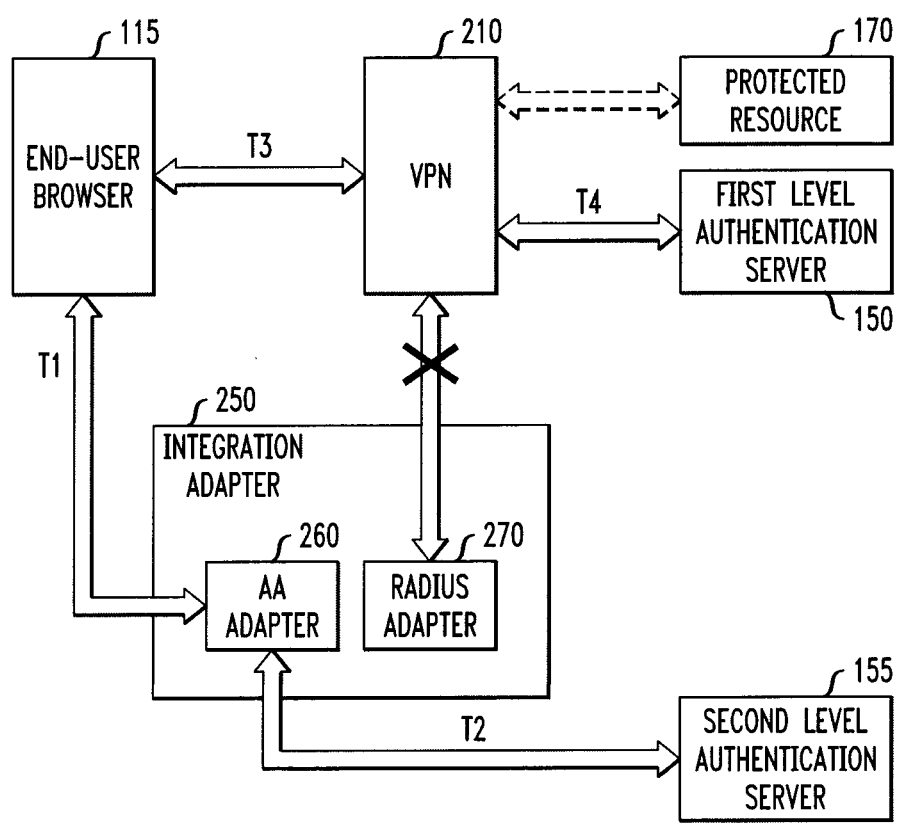

T1 – BROWSER CONTACTS AA ADAPTER TO OBTAIN BEACON IMAGE FOR LOGIN SCREEN
T2 – AA ADAPTER PROVIDES DEVICE DATA INFORMATION TO SECOND LEVEL AUTHENTICATION SERVER
T3 – USER SENDS REQUEST TO VPN TO ACCESS PROTECTED RESOURCE USING ACCESS CREDENTIALS
T4 – VPN PASSES ACCESS CREDENTIALS TO FIRST LEVEL AUTHENTICATION SERVER (FAILURE)

METHODS AND APPARATUS FOR MULTI-FACTOR AUTHENTICATION RISK DETECTION USING BEACON IMAGES

FIELD OF THE INVENTION

The present invention relates generally to security techniques for authenticating users over a network or in other types of communication systems.

BACKGROUND OF THE INVENTION

Service providers receive login attempts from users wishing to gain access to applications, sensitive information and other resources. Some users attempt to gain access to such information and resources with credentials obtained fraudulently from a legitimate account holder. Multi-factor authentication requires that the user of a resource provide more than one form of verification in order to establish their identity and obtain access to the resource.

Multi-factor authentication requires the presentation of two or more of the three authentication factors: something a user knows (such as a password), something the user has (such as a security token) and/or something the user is (such as a biometric of the user). Password verification is often the first level of verification and adaptive authentication techniques are often employed as the second level of authentication. For example, if a user successfully provides a password, adaptive authentication techniques then often compare information associated with the login attempt, such as the time and originating location of the login, with a historical record of expected login behavior.

When invalid first level credentials are submitted, however, the first level authentication server rejects the user. Thus, the second level authentication server is not contacted and no second level authentication occurs. As a result, the second level authentication server is not aware of failed login attempts, which can affect risk detection capabilities for adaptive authentication.

A need therefore exists for improved security techniques that reduce the susceptibility of a legitimate user and protected resources to such attacks. A further need exists for improved multi-factor security techniques that collect device data for each login attempt for risk assessment.

SUMMARY OF THE INVENTION

The present invention in the illustrative embodiments described herein provides methods and apparatus for multi-factor authentication of a user using beacon images. In accordance with an aspect of the invention, access is provided to a protected resource by receiving a browser request for a beacon image, wherein the beacon image is embedded in an access request page (e.g., a login page) for the protected resource; collecting data in response to the browser request from a device associated with the browser; and providing the data for a risk assessment of the request. The beacon image comprises, for example, a substantially invisible image and can be loaded when the access request page is loaded in the browser or when a user submits credentials in the access request page.

The credentials, such as a username and password, can be evaluated using a first level authentication. In addition, an additional authentication of the user can be performed using at least one additional authentication factor, such as a knowledge-based authentication or an adaptive authentication.

The multi-factor authentication techniques of the illustrative embodiments overcome one or more of the problems associated with the conventional techniques described previously, by ensuring that device data is collected for risk assessment for each login attempt. Moreover, no modification of the applications or communication protocols is required. These and other features and advantages of the present invention will become more readily apparent from the accompanying drawings and the following detailed description.

BRIEF DESCRIPTION OF THE DRAWINGS

FIGS. 2 and 3, collectively, illustrate an exemplary conventional multi-factor authentication process;

FIGS. 4 and 5, collectively, illustrate an exemplary multi-factor authentication process incorporating features of the present invention; and FIG. 6 illustrates one possible implementation of a given client-side computing device, authentication server, protected resource or another processing device of the exemplary network environment of FIG. 1.

DETAILED DESCRIPTION

The present invention provides methods and apparatus for multi-factor authentication of a user using beacon images. According to one aspect of the invention, a beacon image (e.g., an invisible one-pixel-size image) is embedded in the login page for a protected resource. The beacon image will be loaded when the page is loaded and/or when the user submits his or her first level authentication credentials. In this manner, direct communication is created between the browser of the user and a second level authentication server (e.g., for adaptive authentication) even before the first level authentication takes place. Thus, the second level authentication server will be informed of the login attempt even if first level authentication fails.

Figure 1:
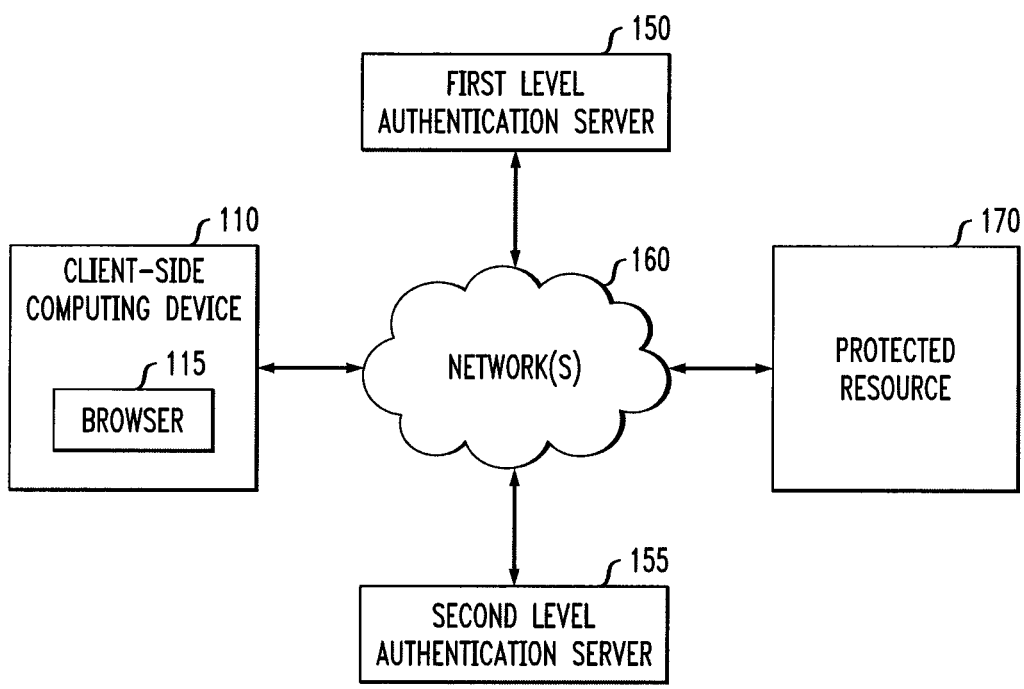
FIG. 1 illustrates an exemplary network environment in which the present invention can operate.

FIG. 1 illustrates an exemplary client-side computing device (CSCD) 110 communicating with a protected resource 170 over a network 160. In an exemplary multi-factor credential implementation, the user may optionally authenticate with a first level authentication server 150 using, for example, to submit first level credentials, such as a username and password, and then perform a second level of authentication with a second level authentication server 155, before obtaining access to the protected resource 170. The network 160, may comprise, for example, a global computer network such as the Internet, a wide area network (WAN), a local area network (LAN), a satellite network, a telephone or cable network, or various portions or combinations of these and other types of networks.

It is to be appreciated that a given embodiment of the disclosed system may include multiple instances of CSCD 110, first level authentication server 150, second level authentication server 155, and protected resource 170, and possibly other system components, although only single instances of such components are shown in the simplified system diagram of FIG. 1 for clarity of illustration. In addition, it is noted that a single server may perform the functions of both the first level authentication server 150 and the second level authentication server 155.

The CSCD 110 may represent a portable device, such as a mobile telephone, personal digital assistant (PDA), wireless email device, game console, etc. The CSCD 110 may alternatively represent a desktop or laptop personal computer (PC), a microcomputer, a workstation, a mainframe computer, a wired telephone, a television set top box, or any other information processing device which can benefit from the use of authentication techniques in accordance with the invention.

As shown in FIG. 1, the exemplary CSCD 110 comprises a browser 115. The CSCD 110 may also be referred to herein as simply a "user." The term "user" should be understood to encompass, by way of example and without limitation, a user device, a person utilizing or otherwise associated with the device, or a combination of both. An operation described herein as being performed by a user may therefore, for example, be performed by a user device, a person utilizing or otherwise associated with the device, or by a combination of both the person and the device. Similarly, a password or other authentication information described as being associated with a user may, for example, be associated with a CSCD device 110, a person utilizing or otherwise associated with the device, or a combination of both the person and the device.

The first level authentication server 150 and/or the second level authentication server 155 can be a third party entity that processes authentication requests on behalf of web servers and other resources, and verifies the authentication information that is presented by a CSCD 110.

The protected resource 170 may be, for example, an access-controlled application, web site or hardware device. In other words, a protected resource 170 is a resource that grants user access responsive to an authentication process, as will be described in greater detail below. The protected resource 170 may be, for example, a remote application server such as a web site or other software program or hardware device that is accessed by the CSCD 110 over a network 160.

Figure 2:
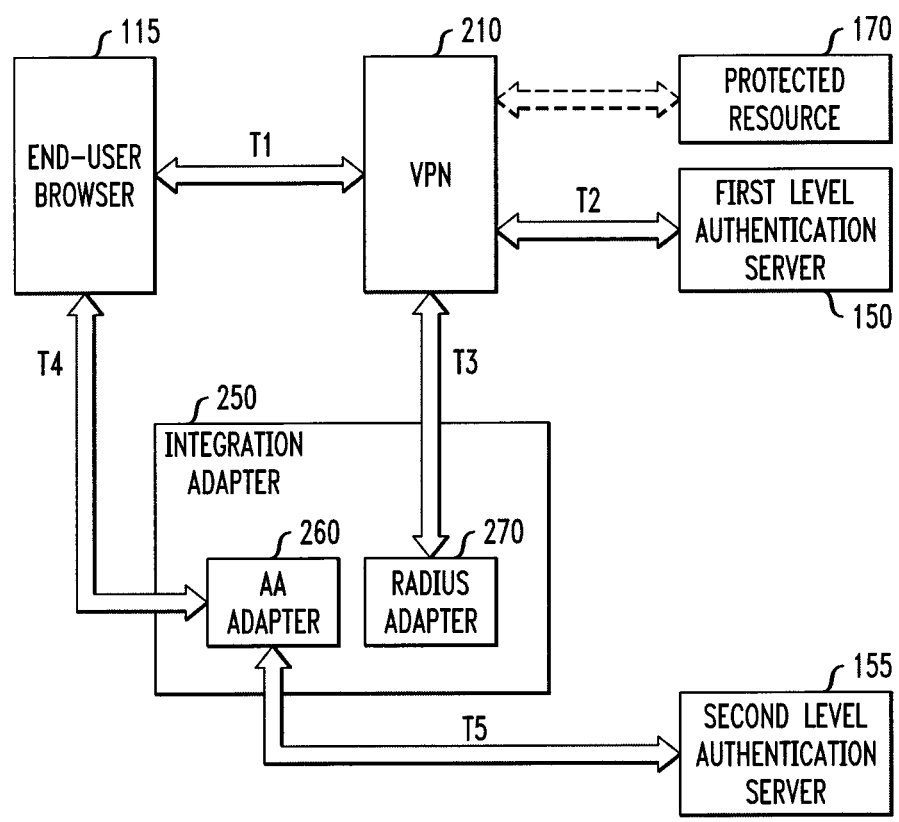

FIGS. 2 and 3, collectively, illustrate communications among various system elements 110, 150, 155 and 170 of FIG. 1 as part of an exemplary conventional multi-factor authentication process 200, at particular points in time, denoted T1 through T5. As shown in FIG. 2, at a time T1, the user sends a request to an exemplary VPN 210 via the browser 115 to access a protected resource 170 using first level access credentials, such as a username and password. At a time T2, the VPN 210 passes the presented access credentials to the first level authentication server 150.

At a time T3, if the user successfully provides the first level access credentials, the VPN 210 contacts an exemplary integration adapter 250 for second level authentication. In one exemplary embodiment, the integration adapter 250 may be implemented, for example, as the RSA Adaptive Authentication Integration Adapter, from RSA, the Security Division of EMC Corp. As shown in FIG. 2, the exemplary integration adapter 250 comprises an Adaptive Authentication (AA) adapter 260 and a RADIUS (Remote Authentication Dial In User Service) adapter 270. While the AA adapter 260 and RADIUS adapter 270 are shown as distinct devices in a common zone, the AA adapter 260 and RADIUS adapter 270 could be implemented as a single device or be in distinct zones. For example, the AA adapter 260 might be in a de-militarized zone while the RADIUS adapter 270 is in a safe zone.

At a time T4, the browser 115 is redirected to the AA adapter 260 for second level authentication. At a time T5, the AA adapter 260 communicates with the second level authentication server 155 for second level authentication.

As previously indicated, when invalid first level credentials are submitted, however, the first level authentication server 150 rejects the user and the second level authentication server 155 is never contacted (no second level authentication occurs). Thus, the second level authentication server 155 is not aware of failed login attempts, which can affect risk detection capabilities for adaptive authentication.

According to one aspect of the invention, a beacon image (e.g., an invisible one-pixel-size image) is embedded in the login page for the protected resource 170. As discussed hereinafter, the beacon image will be loaded when the page is loaded and/or when the user submits his or her first level authentication credentials. In this manner, direct communication is created between the browser 115 of the user and a second level authentication server 155 (e.g., for adaptive authentication) even before the first level authentication takes place. Thus, the second level authentication server 155 will be informed of the login attempt even if first level authentication fails.

Figures 5, 6:
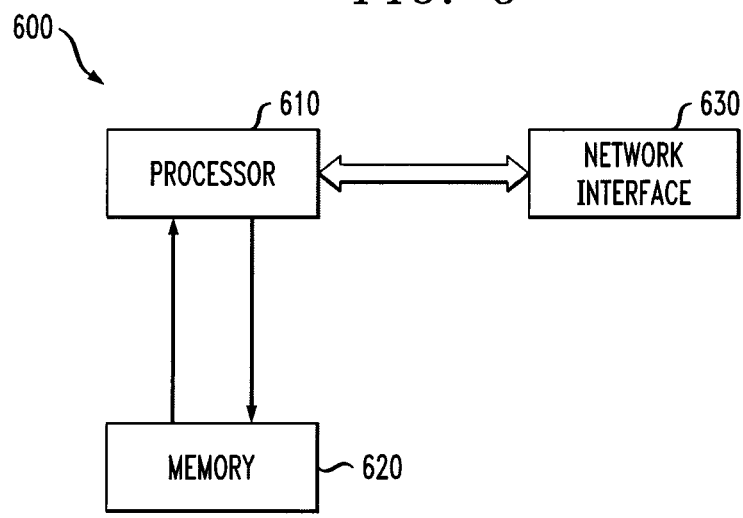

FIGS. 4 and 5, collectively, illustrate communications among various system elements 110, 150, 155 and 170 of FIG. 1 as part of an exemplary multi-factor authentication process 400 incorporating features of the present invention, at particular points in time, denoted T1 through T4. As shown in FIG. 4, at a time T1, upon loading the login page for the protected resource 170, the browser 115 is redirected to the AA adapter 260 to obtain a beacon image for the login screen. At a time T2, the AA adapter 260 provides device data information collected from the device 110 of the user to the second level authentication server 155. For example, the collected device data information may comprise, for example, a browser identifier, one or more cookies, an IP address, language information and packet information.

At a time T3, the browser 115 of the user sends a request to the VPN 210 to access the protected resource 170 using access first level credentials. At a time T4, the VPN 210 passes the first level access credentials to the first level authentication server 150. The second level authentication server 155 learned of the login attempt at time T2. Thus, even in the event of a failure of the first level access credentials, the second level authentication server 155 is aware of the login attempt by the browser 115.

FIG. 6 shows one possible implementation of a given processing device 600 of the FIG. 1 system. The processing device 600 as shown may be viewed as representing, for example, CSCD 110, first level authentication server 150, second level authentication server 155 and/or protected resource 170. The processing device 600 in this implementation includes a processor 610 coupled to a memory 620 and a network interface 630. These device elements may be implemented in whole or in part as a conventional microprocessor, digital signal processor, application-specific integrated circuit (ASIC) or other type of circuitry, as well as portions or combinations of such circuitry elements. As will be appreciated by those skilled in the art, portions of an authentication technique in accordance with an embodiment of the invention can be implemented at least in part in the form of one or more software programs that are stored in memory 620 and executed by the corresponding processor 610. The memory 620 is also used for storing information used to perform computations or other operations associated with the disclosed authentication on techniques.

For a more detailed discussion of suitable token-based authentication techniques, see, for example, U.S. Pat. No. 7,562,221 to Nyström et al., assigned to the assignee of the present invention and incorporated by reference herein.

As mentioned previously herein, the above-described embodiments of the invention are presented by way of illustrative example only. Numerous variations and other alternative embodiments may be used. For example, in the exemplary embodiment, the protected resource 170 delegates the authentication process to the first level authentication server 150 and second level authentication server 155. Thus, upon requesting access to the protected resource 170, the CSCD 110 is initially redirected to the second level authentication server 155 until the multi-factor authentication information is verified. In a further variation, the protected resource 170 can directly request multi-factor authentication information from the CSCD 110 without delegating to the first and second level authentication servers 150, 155, and perform beacon image processing in accordance with the present invention.

In addition, while the exemplary embodiment of the exemplary multi-factor authentication process 400 accesses the beacon image upon loading the login page, the beacon image could alternatively be accessed upon submission of the first level credentials by the user.

Additional details regarding certain conventional cryptographic techniques referred to herein may be found in, e.g., A.J. Menezes et al., Handbook of Applied Cryptography, CRC Press, 1997, which is incorporated by reference herein.

The term "authentication information" as used herein is intended to include passwords, passcodes, answers to life questions, or other authentication credentials, or values derived from such authentication credentials, or more generally any other information that a user may be required to submit in order to obtain access to an access-controlled application. Although the illustrative embodiments are described herein in the context of passwords, it is to be appreciated that the invention is more broadly applicable to any other type of authentication information.

The illustrative embodiments of the invention as described herein provide improved multi-factor authentication of users of protected resources 170. Advantageously, the illustrative embodiments do not require changes to existing communication protocols. It is therefore transparent to both existing applications and communication protocols. The described techniques may be used with security tokens that generate one-time passwords or other types of authentication information, regardless of whether such tokens are connectable to the user device.

It should again be emphasized that the particular multi-factor authentication techniques described above are provided by way of illustration, and should not be construed as limiting the present invention to any specific embodiment or group of embodiments. For example, as previously noted, the described embodiments may be adapted in a straightforward manner to operate with other types of credentials or authentication information, and other types of access-controlled resources. Also, the particular configuration of system elements shown in FIGS. 1, 2 and 4, and their interactions as shown in FIGS. 3 and 5, may be varied in other embodiments. Moreover, the various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

What is claimed is:

1. A method for providing access to a protected resource, comprising the steps of:
   receiving, by at least one processing device of an authentication server, a request from a browser executing on a user device for a beacon image, wherein said beacon image is embedded in an access request page for said protected resource and wherein said request comprises a communication between said user device and said authentication server indicating that said user device requested access to said protected resource;
   collecting data, using said at least one processing device, in response to said browser request for said beacon image from said user device associated with said browser; and
   providing, using said at least one processing device, said data for a risk assessment of said access request to said protected resource.

2. The method of claim 1, wherein said beacon image is loaded one or more of when said access request page is loaded in said browser and when a user submits credentials in said access request page.

3. The method of claim 2, wherein said credentials comprise one or more of a username and password.

4. The method of claim 2, further comprising the step of evaluating said credentials using a first level authentication.

5. The method of claim 1, wherein said access request page comprises a login page.

6. The method of claim 1, further comprising the step of performing an additional authentication of a user using at least one additional authentication factor.

7. The method of claim 6, wherein said at least one additional authentication factor comprises knowledge-based authentication of said user.

8. The method of claim 6, wherein said at least one additional authentication factor comprises adaptive authentication of one or more of a user and a device of said user.

9. The method of claim 1, wherein said beacon image is substantially invisible to a human user.

10. The method of claim 1, further comprising the step of denying access to said protected resource based on one or more predefined rules.

11. An article of manufacture comprising a non-transitory machine-readable recordable storage medium for providing access to a protected resource, wherein one or more software programs when executed by one or more processing devices of an authentication server implement the following steps:
   receiving, by at least one of said processing devices, a request from a browser executing on a user device for a beacon image, wherein said beacon image is embedded in an access request page for said protected resource and wherein said request comprises a communication between said user device and said authentication server indicating that said user device requested access to said protected resource;
   collecting data, using said at least one processing device, in response to said browser request for said beacon image from said user device associated with said browser; and
   providing, using said at least one processing device, said data for a risk assessment of said access request to said protected resource.

12. An authentication server apparatus for providing access to a protected resource, comprising:
   a memory; and
   at least one processing device, coupled to the memory, operative to implement the following steps:
   receiving, by said at least one processing device, a request from a browser executing on a user device for a beacon image, wherein said beacon image is embedded in an access request page for said protected resource and wherein said request comprises a communication between said user device and said authentication server indicating that said user device requested access to said protected resource;

collecting data, using said at least one processing device, in response to said browser request for said beacon image from said user device associated with said browser; and providing, using said at least one processing device, said data for a risk assessment of said access request to said protected resource.

13. The apparatus of claim 12, wherein said beacon image is loaded one or more of when said access request page is loaded in said browser and when a user submits credentials in said access request page.

14. The apparatus of claim 13, wherein said at least one processing device is further configured to evaluate said credentials using a first level authentication.

15. The apparatus of claim 12, wherein said access request page comprises a login page.

16. The apparatus of claim 12, wherein said at least one processing device is further configured to perform an additional authentication of said user using at least one additional authentication factor.

17. The apparatus of claim 16, wherein said at least one additional authentication factor comprises knowledge-based authentication of said user.

18. The apparatus of claim 16, wherein said at least one additional authentication factor comprises adaptive authentication of one or more of said user and said user device.

19. The apparatus of claim 12, wherein said beacon image is substantially invisible to a human user.

20. The apparatus of claim 12, wherein said at least one processing device is further configured to deny access to said protected resource based on one or more predefined rules.

* * * * *